Aug. 22, 1944. H. ROGER 2,356,274
OPTICAL COMPARATOR
Filed June 25, 1942 4 Sheets-Sheet 1

HENRY ROGER
INVENTOR.
BY Ira J. Adams
atty.

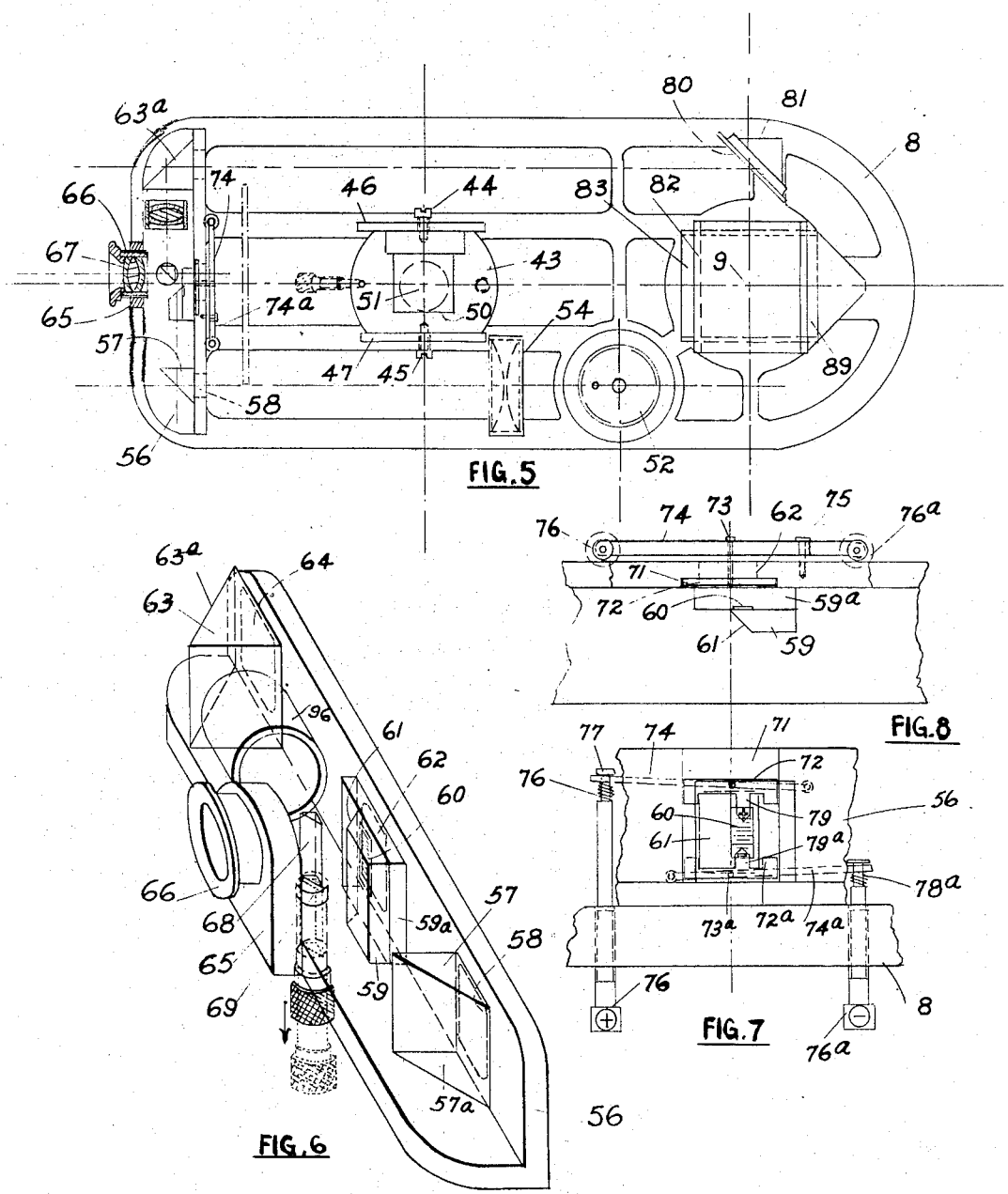

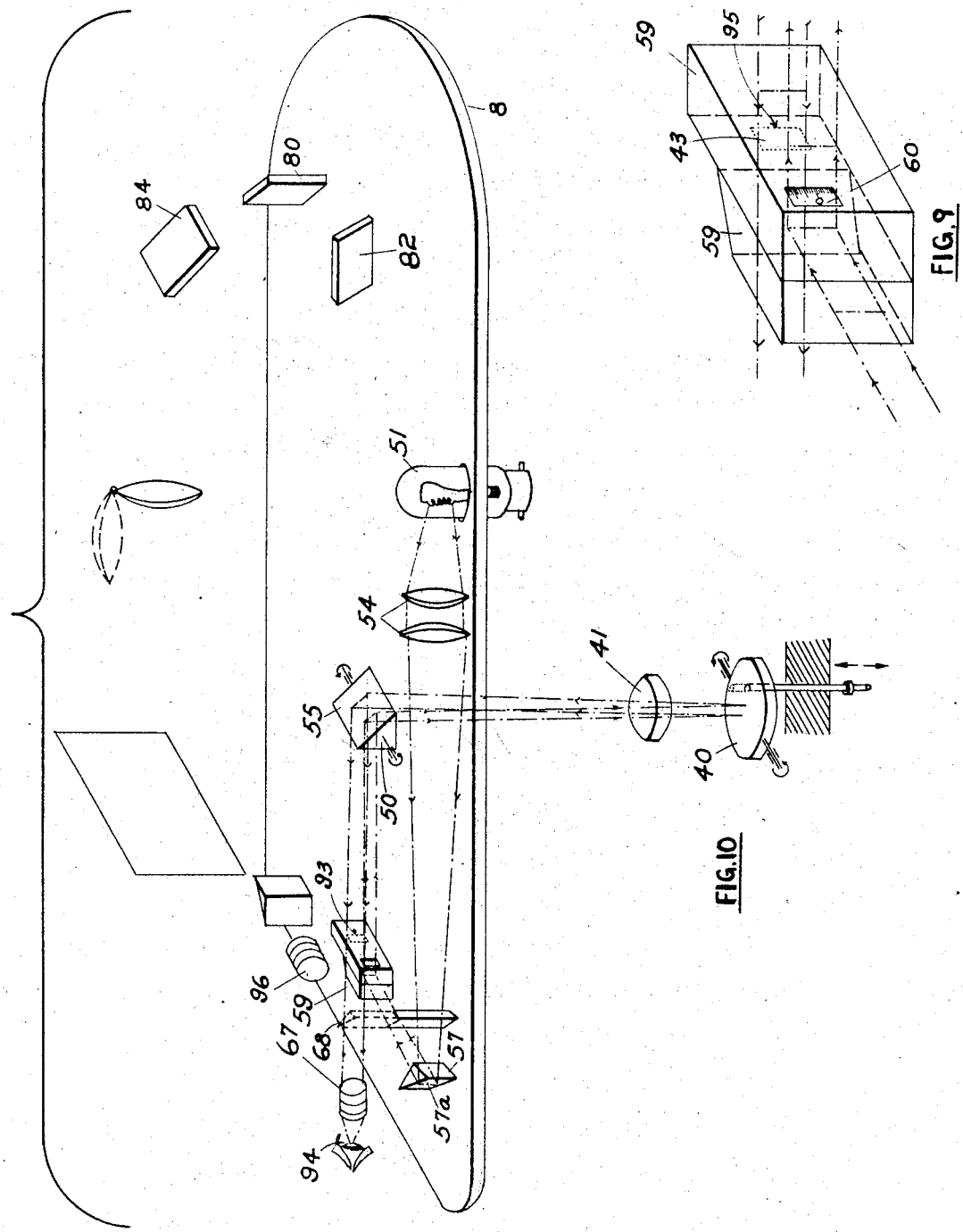

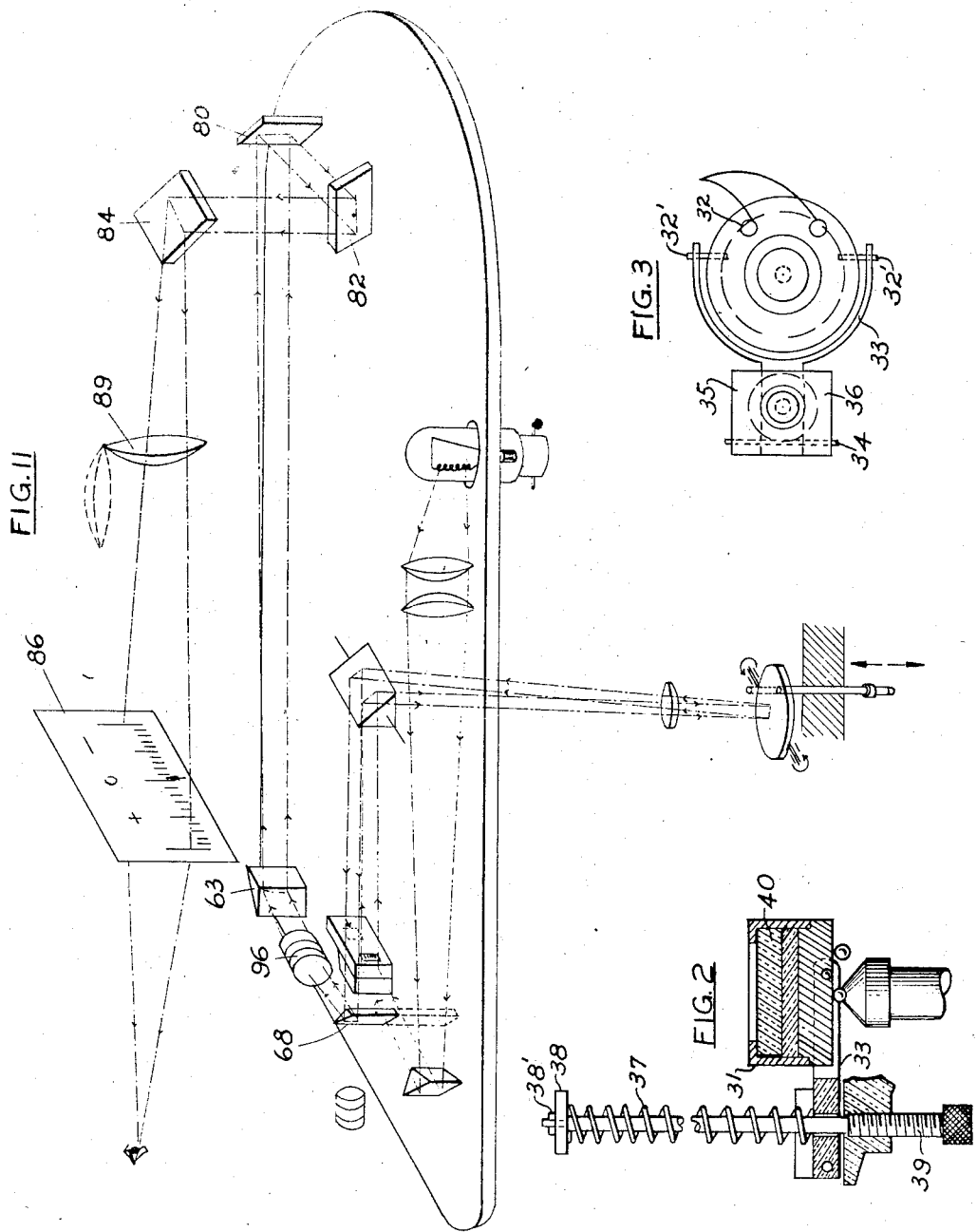

Patented Aug. 22, 1944

2,356,274

UNITED STATES PATENT OFFICE 2,356,274

OPTICAL COMPARATOR

Henry Roger, Sandy Hook, Conn., assignor to American Measuring Instruments Corporation, a corporation of New York Application June 25, 1942, Serial No. 448,379

10 Claims. (Cl. 88—24)

This invention relates to instruments for comparing measurements of work pieces with gauge blocks and similar parts of fixed gauge.

One object of the invention is to provide a combined double optical system for providing subjective and objective readings.

Another object of the invention is to convert movement of the measuring pin in one plane into movement of the projected image in another plane.

Another object of the invention is to provide an optical comparator with convenient means for changing the magnification.

Another object of the invention is to provide adjustments of the zero point applicable to both subjective and objective readings.

Another object of the invention is to provide outside adjustments of the positive and negative limits on the internal scale.

Another object of the invention is to provide light-apertures for indicating the positive and negative limits on the scale or graticule.

Another object of the invention is to provide convenient outside adjustment of the measuring pin pressure.

Another object of the invention is to provide a special construction that will accommodate all the measuring units of the instrument on a single base plate.

Other objects of the invention will appear in the following description, reference being had to the drawings, in which:

Figure 2 is an enlarged sectional elevation of the adjusting means for the measuring pin pressure.

Figure 3 is a plan view of the parts shown in Figure 2.

Figure 5 is a plan view of the parts shown in Figure 1, with the cover piece removed.

Figure 6 is a perspective view of the optical unit shown at the left of Figure 5.

Figure 7 is an elevation of the graticule or scale with means for adjusting the plus and minus tolerances.

Figure 8 is a plan view of the parts shown in Figure 7.

Figure 9 is an enlarged view of the unit containing the scale or graticule.

Figure 10 is a conventional illustration indicating the manner of operation of the instrument in subjective readings.

Figure 11 is a conventional illustration indicating the manner of operation of the instrument in objective readings.

Figure 1:
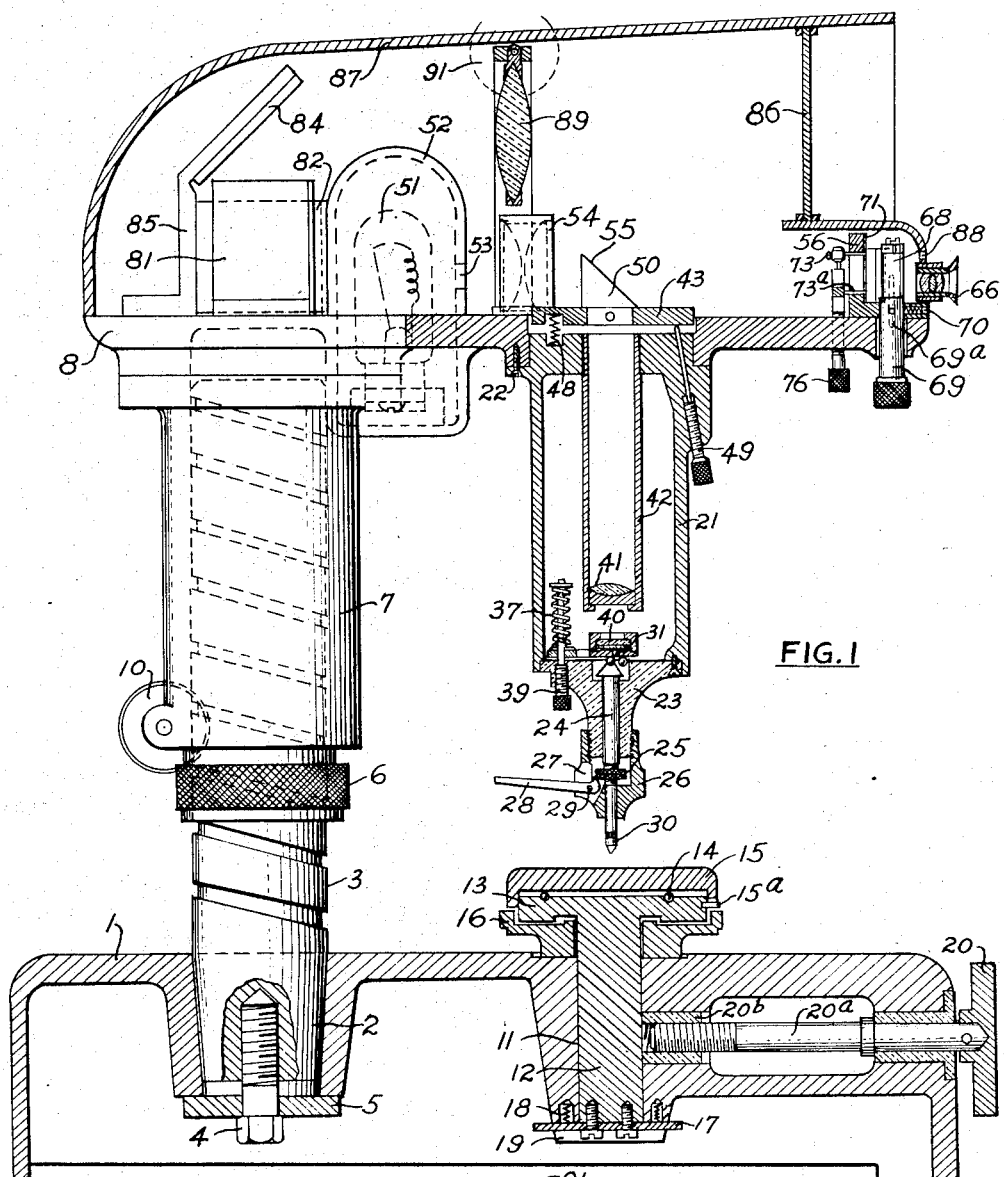
Figure 1 is a sectional elevation of the optical comparator.

Referring to Fig. 1, the instrument of my invention has a base 1 adapted to rest on a bench or other convenient support. The base has a slightly tapered socket 2 receiving a similarly tapered shaft 3, the upper part of which is threaded as shown. A stud 4 and washer 5 clamp the shaft in position on the base. Knurled nut 6 is threaded on the shaft and supports the main sleeve 7, which in turn supports the upper plate or base 8 to which it is secured by any convenient means such as screws or bolts, not shown. The central line of sleeve 7 extends through the point 9 in Fig. 5, but the sleeve and shaft are hidden from view in that figure. Sleeve 7 may be split at the left side in Fig. 1 and a clamping screw 10 provides means for clamping the sleeve in position. By loosening the hand screw 10, the sleeve and the supported structure may be pivoted around the shaft and moved up and down.

The base 1 contains a socket 11 for receiving the stand 12, which has a bearing head 13 containing a raceway and balls 14 supporting anvil 15. The anvil may have a slot and pin connection with the head 13, as at 15a, to prevent rotation of the anvil and for its ready removal from the head for substitution of another anvil. A nut 16 is threaded on the stand 12 for adjustment of the anvil 15. The stand 12 is held in place by a plate 17 fastened to it by suitable screws. Springs 18, between the plate 17 and the socket member, hold the stand in position to take up any backlash. The plate 17 fits in a groove 19 in the socket member, so that the stand can be adjusted vertically by the nut 16, while held from rotation. A hand wheel 20 has a shank 20A with an end threaded in clamp 20B slidingly fitting in the base 1. Operation of the hand wheel moves the clamp against the stand 12 to fix the vertical adjustment after it has been made.

The upper plate or base 8 has a barrel member 21 fastened thereto as by screws 22. A spindle support 23 is fastetned in the lower end of this barrel by suitable screws. A spindle 24 snugly fits in the support and contains a pair of nuts 25 threaded thereon so that they are locked in the desired position. A cap 26 is threaded over the end of the support 23. The cap 26 has a slot 27 containing lever 28 pivoted at 29. The lower end of the spindle 24 has a hardened steel point 30, which is removable to permit use of another tip when desired.

At the top of the support 23, a tilting mirror-housing 31 rests on two balls 32 supported on member 23 and is pivoted at 32' in a fork 33. The fork has a shank pivoted at 34 in two blocks 35, 36 resting on support 23. A spring 37 has one end resting against washer 38, held on the end of an adjusting screw 39 by pin 38'. This screw passes through the spring and fork shank and is threaded in the member 23 for adjustment of the spring tension. The other end of the spring presses against the shank of fork 33 to maintain the mirror-housing against the balls 32 and a ball 39' in the upper end of spindle 24. The balls 32 constitute the fulcrum about which the mirror-housing pivots. By removing the pin 38', the tilting mirror assembly can be readily removed. With this construction, the mirror 40 and its housing is tilted around the fulcrum 32 by movement of the spindle 24 against the force of spring 37. In doing this the yoke 33 pivots around stationary pin 34 and pins 32' secured to housing 31.

It will be noted that the knurled head on screw 39 is located exterior to the barrel 21 and thus the tension of the spring 37 can be readily controlled without disassembling any of the parts.

Above the mirror-housing and substantially co-axial therewith are the object lenses 41, which may be held in the tube 42 in a way similar to the lenses of microscopes and telescopes. The tube 42 is threaded into the base of barrel 21 at the upper end. A glass prism support 43 (see also Fig. 5) is pivoted at 44, 45 between two ears 46, 47 made integral with or otherwise secured to the upper plate 8. A spring 48 is located in sockets in the end of the barrel 21 and in the prism support 43. A screw 49 threaded through the barrel engages the support 43 on the other side of the pivot, so that the prism 50 can be moved around the pivot points 44, 45 in cooperation with spring 48. An incandescent or other suitable lamp 51 is mounted in a socket on the plate 8 and is surrounded by a cover 52 having an opening 53 for passage of the light in the desired direction. A condensing lens 54 is secured to the plate 8 in front of the opening 53.

An angle-shaped support 56 is adapted to support a plurality of members, one of which is the glass prism 57, cemented or otherwise fastened in front of opening 58 through the vertical wall. Glass prism 59 is secured to a translucent member 59a (Figs. 6 and 7) containing a graticule or grating 60 in the path of the beam of light reflected from the beveled surface 61 of the prism 59. To the vertical wall of the support 56 is also secured a second glass prism 63. This prism is cemented over the opening 64 in the vertical wall. An upstanding bracket 65 is fastened to, or made integral with, the base of the support 56 and in this bracket is threaded the optical unit 66 containing the lens 67 of the eye piece. A prism 68 is fastened to a suitable plunger 69 fitted for vertical movement in support 56. A pin and slot arrangement 69a prevents this plunger from rotating in its support and a ball and spring retaining device 70 (see Fig. 1) holds the adjustment. By pulling downward on the knurled head of the prism support 69, the prism 68 can be pulled out of the path of the light beam, as later referred to. In the position shown in Fig. 1, this prism is in such path.

The vertical wall of the support 56 contains a slot 71 behind the graticule member 59a. In the top portion of this slot is arranged the positive limit indicator 72. This positive indicator has a pin 73 fastened therein and extending through the opening 62 in the member 56 and passes through a hole in adjusting arm 74. This adjusting arm is pivoted to the vertical wall of the member 56 by pin 75. The free end of the member 74 may be adjusted in a vertical direction by screw 76 threaded in the upper plate 8. This screw 76 has a head 77 engaging the free end of the arm 74. A spring 78 keeps the end of this arm in engagement with the head of the shank. The indicator member 72 has an indicator tip 79 containing cross slots, so that the light can pass therethrough and thus produce a visible "plus" sign of light to indicate the positive upper limit or tolerance on the graticule for the work piece being compared. Thus, by manipulation of the screw 76, the upper limit can be adjusted to indicate by the pointer 79 the tolerance in scale readings as may be called for by the work piece. A similar negative tolerance or limit is supplied by the pointer 79a, which contains a single slot to produce a "minus" by the light beam passing therethrough. The adjusting arm and screw for this minus pointer are given the same reference characters for similar parts as the positive adjustment, except that the letter a has been added thereto, and the construction will be understood without further description.

The angle bar 56, with its assembled units, is fastened in any way to the upper plate 8 in the position shown in Fig. 1. At the left-hand side of Fig. 1 (at the right-hand side of Fig. 5) is arranged a mirror 80 cemented to a bracket 81 on the upper plate 8. This mirror is positioned to receive the rays totally reflected from the beveled surface 63a of the prism 63. The reflected ray from mirror 80 is projected onto the mirror 82, cemented or otherwise fastened to bracket 83, integral with or secured to the upper plate 8. The reflected ray from mirror 82 is incident on mirror 84, held in bracket 85 fastened to upper plate 8. These mirrors 80, 82 and 84 have the angular positions for reflecting the rays of light as more clearly illustrated in Figs. 10 and 11.

The screen 86, on which the reading of the indication of the tested work piece is projected, is fastened to the removable cover 87, as indicated in Fig. 1. This cover may be stamped from sheet metal, or otherwise formed from desired material, to fit over the various units fastened to the upper plate 8, including the support member 56. This cover is slotted to fit over the bracket 65 containing the eye piece 66 and can be readily removed when desired.

Figure 4:
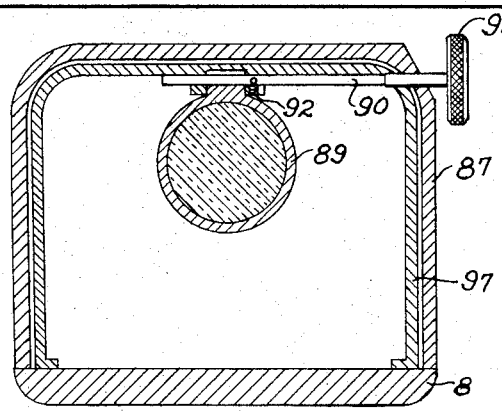
Figure 4 is a sectional detail view of the magnification adjustment indicated at the top of Figure 1.

The lenses used in the indicator, as already described, may produce any desired magnification, say 1,000 to 1, but at times it is desirable to increase this magnification and I therefore have provided an additional optical unit 89 containing lenses to increase the magnification to any desired amount, say, 2,000 to 1. This optical unit is shown fastened to pin 90 (Fig. 4) pivoted in a support 97 fastened to plate 8. This pin has a knurled knob 91 so that it can be swung either into or out of the path of the beam of light reflected from the mirror 84. A spring and ball arrangement 92 will hold the adjustment for positioning the lens either in the path of the light beam or out of such path. In Fig. 1 the adjustment is shown with the lens in the path of the light beam.

The operation of the instrument for testing work pieces will now be described:

Let it be supposed that a work piece of one inch thickness is to be tested for accuracy, with a tolerance of plus or minus one-thousandths of an inch. Let it also be supposed that the operator desires to use the instrument for subjective readings. The plunger 69 is pulled downward (Figs. 1 and 6) so that the prism 68 will not be in the path of the light beam proceeding towards the eye piece 66.

The nut 6 on the shaft 3 is adjusted to such position as to permit the ready insertion of a Johannson block, or other standard, of exactly one inch dimension, between the anvil 15 and the spindle tip 30. The lever 28 may also be pressed downwards to raise the spindle while this is being done. The lever 28 is then released and the nut 16 is rotated to adjust the anvil and the supported standard block until the latter engages the spindle tip 30. This position is then fixed by rotating the clamping wheel 20.

Light from the lamp 51 will proceed through condensing lens 54 into prism 57 and will be totally reflected by the beveled surface 57a. The reflected beam will pass into the prism 59, where it will be totally reflected from the beveled surface 61 through the scale or graticule 60. The light beam then passes into prism 50 and the beveled surface 55 will totally reflect the beam through object lens 41 to the mirror 40. The mirror 40 has a slight side tilt so that the reflected beam is at one side of the incident beam of light. The former passes through the object lens 41 into prism 50 and is reflected onto the area or screen 93 of the glass member 59a (see Fig. 9). The lenses through which the beam of light passes, as just described, are such that an image of the graticule is focused on the screen 93, which contains a zero point such as arrow point 95 (Fig. 9). The eye of the operator at 94 can observe this image through the lenses 67. If a further adjustment of the zero point is required, it can be made by turning the screw 49 to move the support 43 and the prism 50 about pivot points 44, 45.

The screws 76 and 76a are now adjusted to locate the pointers 79, 79a at the correct divisions on the graticule for the tolerance specified. The lever 28 is pressed downwards to elevate the spindle 24, the standard one inch block is removed and the work piece to be compared is inserted in its place. The lever 28 is then released and the spindle permitted to rest on the work piece. If this work piece is exactly the same size as the standard, the mirror 40 will not be tilted at a different angle by the spindle 24 and the zero point on the graticule 60 will exactly coincide with the arrow point, both of these being viewed by the eye as at 94. If the work piece is of a different size, say, plus two-thousandths, the zero point of the graticule will be moved so that the positive indicator 79 will pass the arrow point 95, showing that the piece should be rejected as oversize. If the size, on the other hand, is only one-thousandths of an inch positive, the one-thousandths indication on the graticule 60 on the positive side will be in line with the arrow 95. This being within the one-thousandths of an inch tolerance, the work piece would be considered acceptable.

If the piece being tested should be undersize, the mirror 40 would be tilted by the spindle 24 so that the minus side of the graticule would be opposite the arrow point 95 and the reading on the scale would show the extent that it is undersize.

In many cases it is desirable to project the reading on a screen instead of examining the reading through an eye piece, as just described. When this is desired, the support 68 below the eye piece is pushed upwards until the glass prism 68 is in the path of the light passing through the surface 93 (Fig. 1). The light beam then is totally reflected into lens 96 and is totally reflected by prism 63 to mirror 80, where the beam is reflected to mirror 82 and again reflected to mirror 84. The beam reflected from mirror 84 passes to the glass or other screen 86. The construction of lens 96 is such that the graticule reflected by the mirror 40 is focused on the screen 86 and the indication will be read directly on this screen by the operator in a way that will be apparent.

Whenever it is desired to increase the magnification, a simple turn of the screw head 91 throws the lens 89 into the path of the beam projected onto the scale.

By my construction I have provided an optical comparator that permits adjustment for all necessary comparisons and instantaneous changes may be readily made from objective to subjective readings, and vice versa. The construction is also such that the instrument is small and compact and can be readily moved from place to place for use at various points.

Various modifications may be made without departing from the spirit of my invention.

Having described my invention, what I claim is:

1. An optical comparator comprising a tiltable mirror, means contacting the object to be compared for tilting said mirror, a graticule, means for projecting light onto said graticule, a screen, means for focusing an image of said graticule on said screen by rays of light proceeding from said graticule and reflected from said mirror, means operated from outside the comparator for directing light from said image into either of two paths, an eye piece in one of said paths whereby said image may be viewed by the operator, a second screen, and means in the other path for projecting an enlarged image of the first-mentioned image on said second screen.

2. An optical comparator as set forth in claim 1 having positive and negative tolerance indicators adjacent the grating and means operated from outside the comparator for adjusting said indicators to the desired position.

3. An optical comparator as set forth in claim 1 having means operated from outside thereof for adjusting the position of the image on said screens.

4. An optical comparator as set forth in claim 1 having a prism located in the path of light and a support plate therefor, with means operated from outside the comparator for adjusting said support plate and prism.

5. An optical comparator as set forth in claim 1 having tolerance indicators adjacent the grating with plus and minus signs thereon to produce silhouettes on said screens, and means operated from outside the comparator for adjusting said indicators to the desired position.

6. An optical comparator as set forth in claim 1 having means for producing movement in one direction of the image on the second screen by movement of the object-contacting means in a direction at right angles thereto.

7. An optical comparator as set forth in claim 1 having a spring yieldingly resisting the movement of the mirror, and means operated outside the comparator for adjusting the tension of said spring.

8. An optical comparator as set forth in claim 1 having a spring yieldingly resisting the movement of the mirror and the tilting means, and means operated outside the comparator for adjusting the tension of said spring.

9. An optical comparator comprising a tiltable mirror, means contacting an object to be compared for tilting said mirror, a graticule, means for projecting light onto said graticule, a screen, means for focusing an image of said graticule on said screen by the rays of light proceeding from said graticule and reflected from said mirror, an eye piece in the path of the light emitted by said image whereby said image may be viewed by the operator, a second screen, a magnifying lens positioned to project an image on the second screen and means adapted to be adjusted from outside the comparator for deflecting the light from said path to said magnifying lens whereby an enlarged second image of the first image is projected onto said second screen.

10. An optical comparator comprising a tiltable mirror, means contacting an object to be compared for tilting said mirror, a graticule, means for projecting light onto said graticule, a screen, means for focusing an image of said graticule on said screen by the rays of light proceeding from said graticule and reflected from said mirror, an eye piece in the path of the light emitted by said image whereby said image may be viewed by the operator, a second screen, a magnifying lens positioned to project an image on the second screen, means adapted to be adjusted from outside the comparator for deflecting the light from said path to said magnifying lens whereby an enlarged second image of the first image is projected onto said second screen, means for producing a further enlarged image on the second screen, and means operated from outside the comparator for moving the last-mentioned means into the path of the rays projected onto the second screen.

HENRY ROGER.